United States Patent
Harris et al.

(10) Patent No.: US 10,811,928 B2
(45) Date of Patent: Oct. 20, 2020

(54) EXTRUDED HOUSING FOR ELECTRIC MOTOR

(71) Applicant: Goodrich Actuation Systems Limited, West Midlands (GB)

(72) Inventors: Paul Charles Harris, Leighton Buzzard (GB); Edward Graham Charles Pocock, Milton Keynes (GB); Chris H. A. Claycomb, Leighton Buzzard (GB)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 309 days.

(21) Appl. No.: 15/183,844

(22) Filed: Jun. 16, 2016

(65) Prior Publication Data

US 2017/0033639 A1    Feb. 2, 2017

(30) Foreign Application Priority Data

Jul. 29, 2015 (EP) ..................... 15178844

(51) Int. Cl.
*H02K 1/32* (2006.01)
*H02K 5/18* (2006.01)
*H02K 15/14* (2006.01)

(52) U.S. Cl.
CPC ............. *H02K 5/18* (2013.01); *H02K 15/14* (2013.01)

(58) Field of Classification Search
CPC ................................. H02K 5/18; H02K 15/14
USPC .......................................................... 310/64
See application file for complete search history.

(56) References Cited

U.S. PATENT DOCUMENTS

| 4,879,891 | A | 11/1989 | Hinshaw |
| 6,138,488 | A | 10/2000 | Lee |
| 6,735,864 | B2 | 5/2004 | Sato et al. |
| 7,623,348 | B2 * | 11/2009 | Otsuki ............... H01L 23/3672 |
| | | | 165/121 |
| 8,427,018 | B2 * | 4/2013 | Dutau ..................... H02K 1/20 |
| | | | 310/52 |
| 2002/0162647 | A1 * | 11/2002 | Wagner .................... B21K 1/36 |
| | | | 165/121 |
| 2012/0279040 | A1 | 11/2012 | Liang et al. |
| 2014/0239762 | A1 * | 8/2014 | Durland ................... H02K 5/18 |
| | | | 310/105 |
| 2015/0256045 | A1 * | 9/2015 | White ...................... H02K 5/18 |
| | | | 310/59 |

FOREIGN PATENT DOCUMENTS

| CN | 101752945 A | 6/2010 |
| CN | 103084813 A | 5/2013 |
| EP | 0432322 A1 | 6/1991 |
| JP | H11299174 A | 10/1999 |

(Continued)

OTHER PUBLICATIONS

Extended European Search Report; Application No. 15178844.5-1806; dated Jan. 25, 2016; 9 pages.

(Continued)

*Primary Examiner* — Jianchun Qin
(74) *Attorney, Agent, or Firm* — Cantor Colburn LLP

(57) ABSTRACT

An extruded housing for an electric motor comprises: an extruded cylindrical body for holding electrical parts of the motor, extruded axial fins formed about the outside of the cylindrical body, and radial cuts machined through the axial fins.

13 Claims, 5 Drawing Sheets

(56) References Cited

FOREIGN PATENT DOCUMENTS

| JP | 2006509984 A | 3/2006 |
| JP | 2013207971 A | 10/2013 |
| WO | 2004055958 A1 | 7/2004 |

OTHER PUBLICATIONS

Tong Wei: "Mechanical Design of Electric Motors"; CRC Press, Boca Raton, London, New York, XP055241213; Jan. 1, 2014; 3 pages.
JP Office Action for Patent Application No. JP2016-128286, dated Dec. 10, 2019, 4 pages.

* cited by examiner

EXTRUDED HOUSING FOR ELECTRIC MOTOR

FOREIGN PRIORITY

This application claims priority to European Patent Application No. 15178844.5 filed Jul. 29, 2015, the entire contents of which is incorporated herein by reference.

TECHNICAL FIELD

The invention relates to an extruded housing for an electric motor and to a related method of manufacturing a housing for an electric motor, for example for an aerospace electric motor.

BACKGROUND OF THE INVENTION

Electric motors, in general terms, consist of moving and stationary parts forming a rotor and stator of an electrical machine, with these parts being enclosed in a housing. The housing acts to protect the moving parts, and in addition may have the function of dissipating heat that is produced by the motor. The dissipation of heat is of particular importance in high performing motors and/or in motors that are intended to be used where there are restrictions on the space and orientation required for installation of the motor. It is also of particular importance when structures surrounding the motor are sensitive to heat, for example if there are structures made of composite materials (which often necessitates a maximum temperature of 120° C.). Often, all of these factors will apply, for example in the case of motors for aerospace use.

FIG. 1 shows a known "bucket" style motor housing 12 including a bearing support 14 at one end, for supporting a bearing of the motor, and with a number of radial fins 18 on the exterior of the housing for dissipation of heat. In this example prior art device the main body of the housing 12 has a circular section to fit the rotating parts of the motor efficiently, but the radial fins 16 are formed so as to fill a space with a square section. This is since the motor is intended to fit within an installation location with a square shape. The housing 12 of FIG. 1 provides a good performance in terms of heat dissipation, but it is expensive as a large amount of machining time is required in order to produce the radial fins, and since the machining operation generates a significant amount of waste material.

An alternative known arrangement is shown in FIG. 2. In order to produce a housing 12 with low cost the cylindrical part of the housing 12 is extruded. The extrusion process includes the production of axial fins 18 about the outside of the housing 12. It will be appreciated that with this type of extruded housing a similar surface area for heat transfer can be produced to that seen in the machined housing of FIG. 1, and at a considerably lower cost.

SUMMARY

Viewed from a first aspect, the invention provides an extruded housing for an electric motor, the housing comprising: an extruded cylindrical body for holding electrical parts of the motor, extruded axial fins formed about the outside of the cylindrical body, and radial cuts machined through the axial fins.

The inventors have realised that whilst the extruded arrangement of FIG. 2 provides substantial benefits in costs in comparison to the machined housing with radial fins shown in FIG. 1, there is also a significant disadvantage when it is necessary to use the motor housing in a horizontal orientation. The axial fins have been found to be highly inefficient in dissipating heat by natural convection in this orientation. FIGS. 3 and 4 show a comparison of the thermal performance for the radial fin and the axial fin designs. The difference in performance is very much higher than might be expected. The radial fin housing temperature peaks at 105° C., whilst the axial fin housing rises by a further 115° C. to a peak of 220° C. By incorporating radial cuts via machining after the extrusion then the efficiencies lost with axial fins may be recovered. Thus, the inventors have found that a relatively simple post extrusion machining process results in a surprisingly large increase in performance. The performance gain far exceeds any disadvantage arising from the cost of the additional machining. The cost for manufacture of a housing as in the first aspect will be about 10-25% of the cost of manufacture for a fully machined housing of similar thermal performance. The proposed housing may also be used in either a vertical or a horizontal orientation with good thermal performance.

Whilst many types of heat sinks, including those using a combination of extrusion and post extrusion machining, are known in other fields, for example for computing applications, it has not before been proposed to produce a cylindrical motor housing incorporating axial fins extruded along with a cylindrical body of the motor housing and radial cuts machined after the extrusion process. Known heat sinks having fins formed via a combination of extrusion and post extrusion machining, for example the heat sinks of U.S. 2012/0279040 or U.S. Pat. No. 6,138,488, are in distinct and unrelated technical fields, and are produced in ways incompatible with the production of cylindrical elements with radial cuts.

The cuts may extend around all or a major part of a circumference of the housing. Thus, there may be a plurality of radial cuts which each pass through a plurality of the axial fins, such as through three or more fins, preferably through a majority of the axial fins, and optionally through all of the axial fins about a circumference of the housing.

The radial cuts may be cuts formed by turning the extruded part relative to a machine tool. The part may be turned through at least 180° for each radial cut, or through 360° or multiples thereof. For example the cuts may be machined on a lathe, or using a milling machine with a rotating mounting for the cylindrical body. The housing may be rotationally symmetrical. The process of machining radial cuts into a rotationally symmetrical housing allows for a housing of significantly increased performance to be obtained without a significant disadvantage in terms of the cost of production. In one example arrangement the axial fins are formed to fill a space having a square section.

The radial cuts may have a width of between 5 and 15 mm, for example a width of 5 to 10 mm. The portions of axial fin remaining between cuts may be at least the same width as the cut width and in some examples are larger than the cut width. Thus, the pitch between cuts may be twice the cut width, or larger. In typical examples the pitch between cuts is in the range 5 to 50 mm, for example a pitch of 20 to 40 mm. In one example arrangement the cut width is about 10 mm and the pitch between cuts is about 30 mm.

The cut width and pitch may be varied dependent on the size of the motor and on the spacing of the extruded axial fins. For example, the portions of axial fin remaining between cuts may have a width that is about the same as the spacing between the axial fins, for example a width that is 75% to 125% of the spacing between axial fins. The spacing between the axial fins may be in the range 5 to 40 mm, for example. Typical motor diameters might require a cylindrical body with a diameter in the range 100 to 150 mm, and the cut widths and pitches discussed above can be applied to such cylindrical bodies. The pitch may be 10 to 30% of the diameter of the cylindrical body. The cut width may be 2 to 20% of the diameter of the cylindrical body. In an example arrangement with the cut width of about 10 mm and a pitch of about 30 mm then the motor diameter may be in the above range, for example a diameter of about 115 mm.

The cut width and/or pitch may be the same about the circumference of the cylindrical body and along the length of the cylindrical body. This can allow for optimised heat transfer and air flow about the entirety of the cylindrical body. Alternatively, in some situations it may be advantageous to have a variable width and/or pitch, hence allowing for variable heat transfer performance at different parts of the circumference and/or different parts of the length of the cylindrical body. The housing may be formed of any suitable material, for example aluminium alloys may be used.

In example embodiments an electric motor is provided with a housing as described above. The electric motor may be an aerospace motor. The housing may include a bearing support at one end of the cylindrical body for holding bearing elements of the motor.

Viewed from a second aspect, the invention provides a method of manufacture of an extruded housing for an electric motor, the method comprising: extruding a cylindrical body for holding electrical parts of the motor the extrusion including axial fins formed about the outside of the cylindrical body; and machining radial cuts through the axial fins.

The step of machining radial cuts through the axial fins may comprise machining by turning the cylindrical body on a lathe or using a milling machine as discussed above. The housing and the various parts thereof may be manufactured with features as described above.

The method may be a method of manufacturing an electric motor, such as an aerospace motor, the method comprising manufacturing a housing as above, and then installing the electrical parts of the motor within the housing.

BRIEF DESCRIPTION OF DRAWINGS

Certain preferred embodiments of the invention will now be described by way of example only and with reference to the accompanying drawings in which.

DETAILED DESCRIPTION OF THE INVENTION

Figure 1:
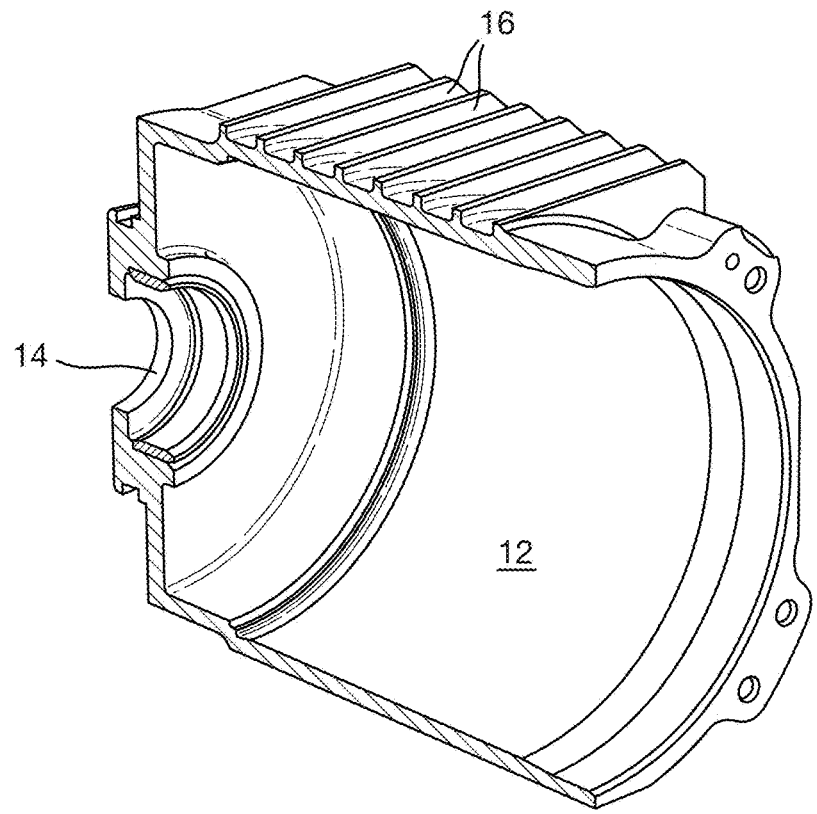
FIG. 1 is a perspective view of a prior art electric motor housing.
Figure 2:
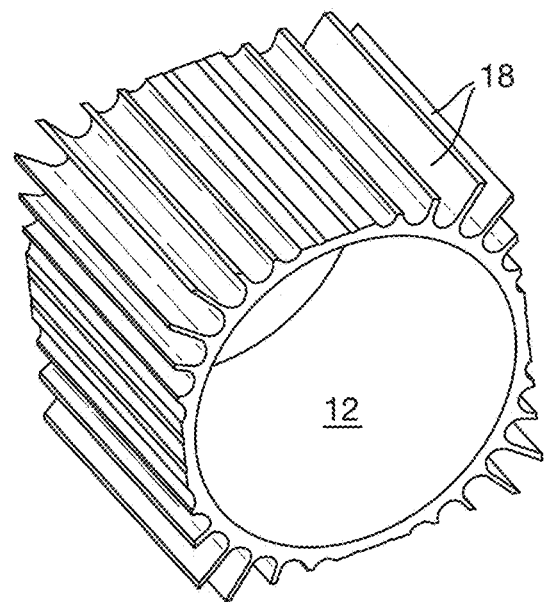
FIG. 2 shows a part of a prior art extruded housing.
Figure 3:
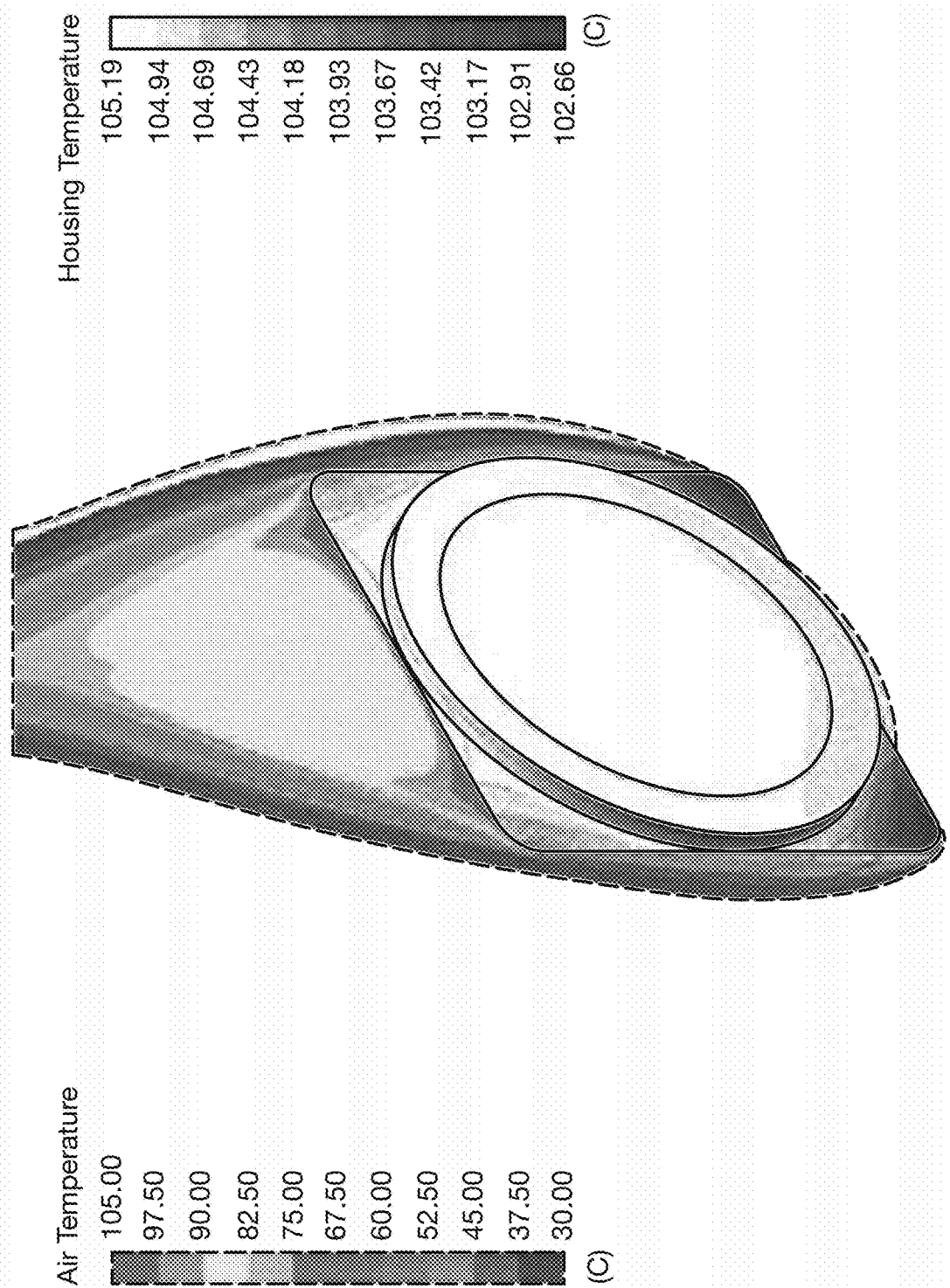
FIGS. 3 and 4 illustrate the results of modelling the thermal performance of the housings of FIGS. 1 and 2.
Figure 4:
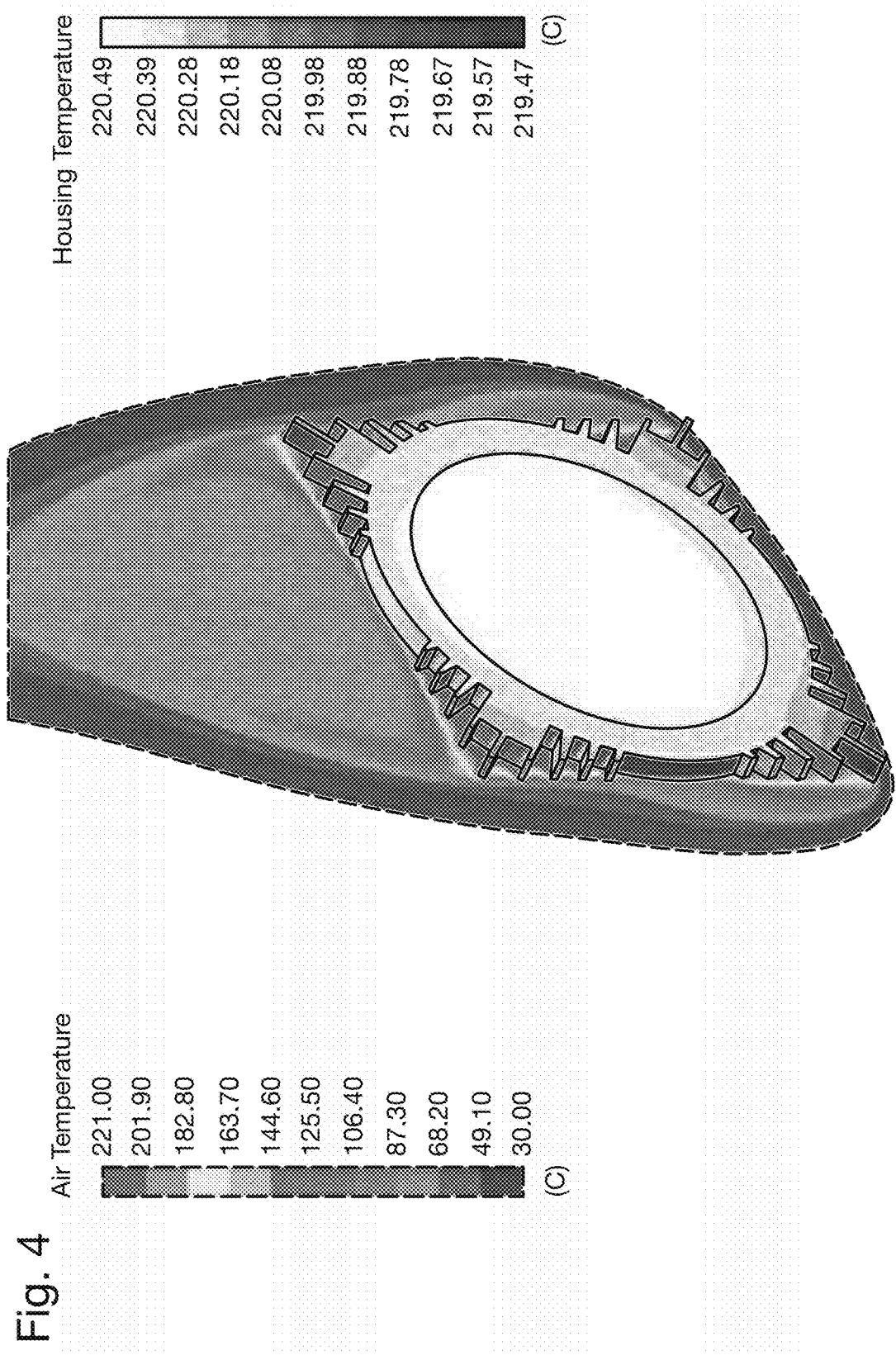
Figure 5:
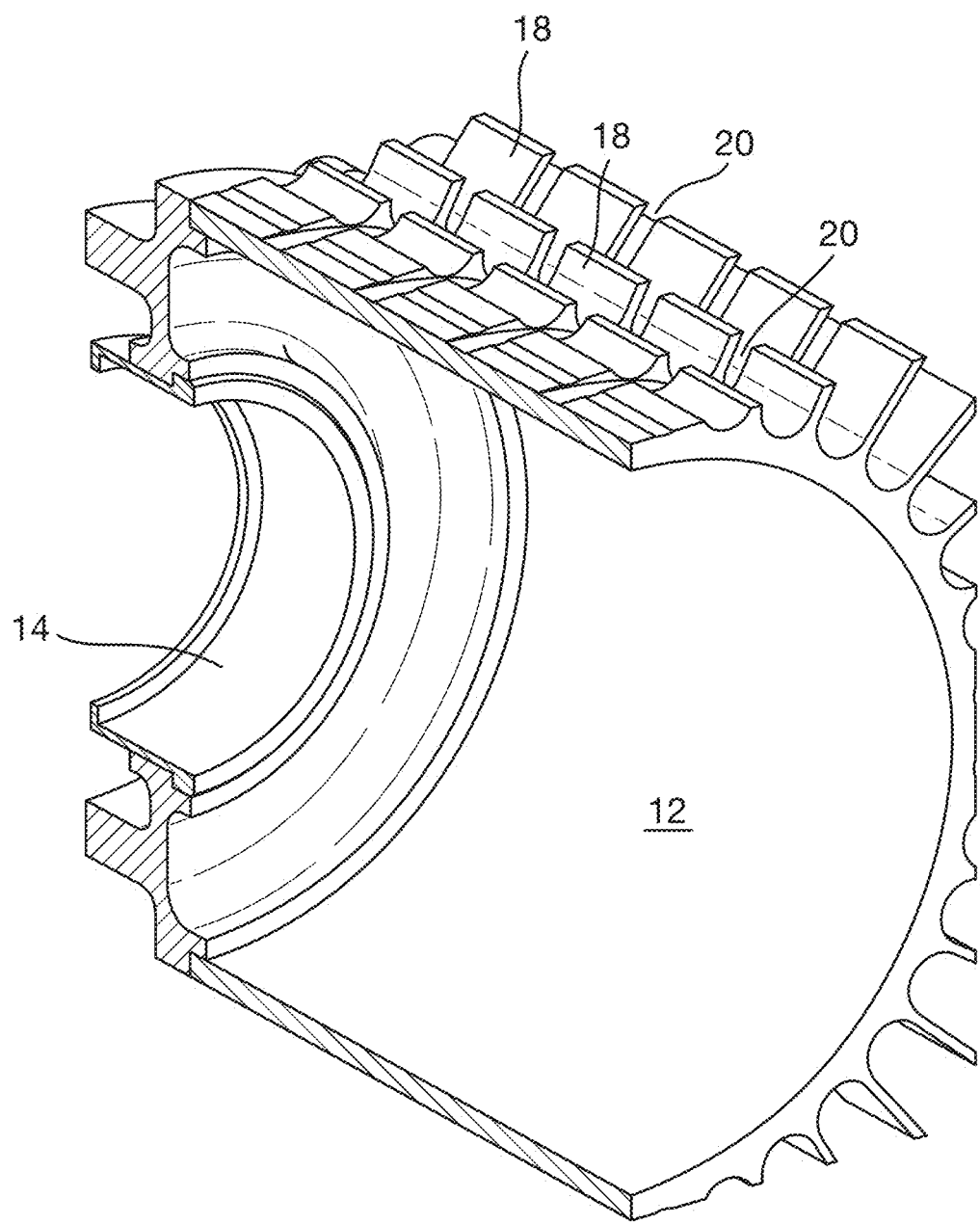
FIG. 5 is a perspective view of an extruded motor housing with radial cuts.

The prior art housings of FIGS. 1 and 2, and the thermal performances shown in FIGS. 3 and 4 have been discussed above. FIG. 5 shows a proposed extruded motor housing 12 with axial fins 18 having radial cuts 20 extending circumferentially around the external surface of the housing 12. This extruded motor housing 12 may be formed by an extrusion process similar to that used for the housing 12 of FIG. 2, followed by a machining step where the radial cuts 20 are machined using a lathe or other machine tool. The use of a lathe allows for quick and effective machining of radial cuts into a rotationally symmetric component such as the motor housing 12. The motor housing 12 also includes a bearing support 14, which can be separately manufactured and then mounted to the cylindrical body of the housing 12 via any suitable means, for example via friction fit, brazing or welding.

Figure 6:
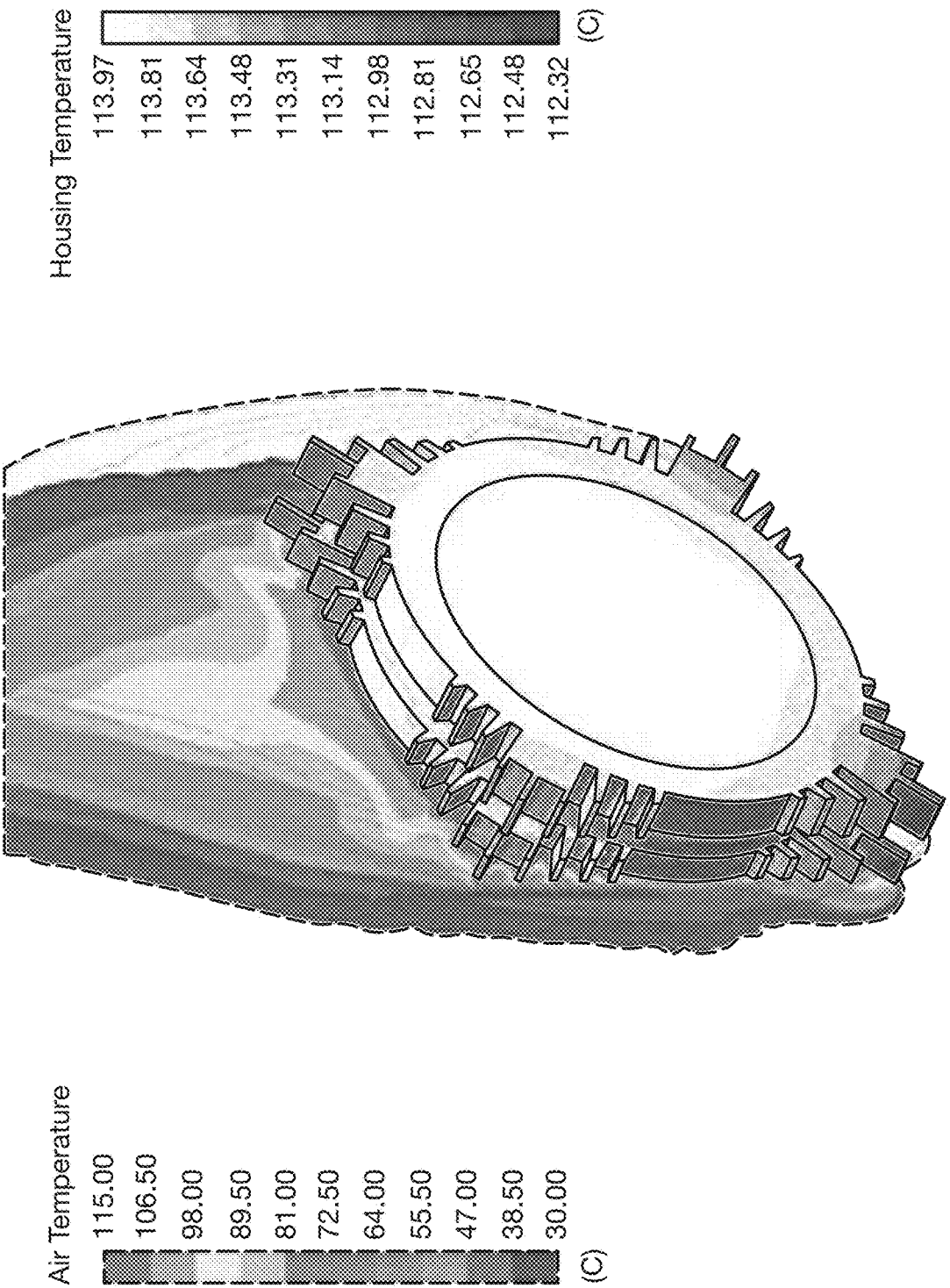
FIG. 6 illustrates the results of modelling the thermal performance of the housing of FIG. 5.

As can be seen by a comparison of the thermal performance shown in FIG. 6 with the thermal performance shown in FIGS. 3 and 4, the addition of radial cuts reduces the peak temperature of the housing considerably compared to the axial extrusion without radial cuts. With radial cuts the housing temperature reaches a maximum of 114° C., as compared to a maximum of 220° C. when the cuts are not present. In fact, the housing temperature is comparable to the far more expensive design with machined radial fins, which reaches a maximum temperature of 105° C. The proposed design therefore achieves significant advantages in performance and cost when compared with the prior art of FIGS. 1 and 2.

The invention claimed is:

1. An extruded housing for an electric motor, the housing comprising: an extruded cylindrical body for holding electrical parts of the motor, extruded axial fins formed about the outside of the cylindrical body, wherein the extruded axial fins are formed by forcing material through a die to obtain a fixed cross-sectional profile for each of the extruded axial fins; and a plurality of radial cuts machined by cutting through a plurality of the axial fins wherein each of the radial cuts extends around all or a major part of a circumference of the housing, wherein each of said radial cuts forms an airflow channel without being blocked by any part of the housing or the electric motor.

2. An extruded housing as claimed in claim 1, wherein the radial cuts are cuts formed by turning the extruded part relative to a machine tool.

3. An extruded housing as claimed in claim 1, wherein the cuts are cuts that have been machined on a lathe.

4. An extruded housing as claimed in claim 1, wherein the housing is rotationally symmetrical.

5. An extruded housing as claimed in claim 1, wherein the radial cuts have a width of between 2 mm and 15 mm.

6. An extruded housing as claimed in claim 1, wherein the portions of axial fin remaining between cuts are at least the same width as the cut width.

7. An extruded housing as claimed in claim 1, wherein the pitch between cuts is at least twice the cut width.

8. An extruded housing as claimed in claim 1, wherein the pitch between cuts is in the range 5 mm to 50 mm.

9. An extruded housing as claimed in claim 1, wherein the portions of axial fin remaining between cuts have a width that is about the same as the spacing between the axial fins.

10. An extruded housing as claimed in claim 1, wherein the pitch between cuts is 10% to 30% of the diameter of the cylindrical body.

11. An extruded housing as claimed in claim 1, wherein the width of the radial cuts is 2% to 20% of the diameter of the cylindrical body.

12. An electric motor including a housing as claimed in claim 1.

13. A method of manufacture of an extruded housing for an electric motor, the method comprising: extruding a cylindrical body for holding electrical parts of the motor the extrusion including axial fins formed about the outside of the cylindrical body, wherein extruding the axial fins includes forcing a material forming the axial fins through a die to obtain a fixed cross-sectional profile for each of the axial fins; and machining a plurality of radial cuts by cutting through a plurality of the axial fins, wherein each of the radial cuts extends around all or a major part of a circumference of the housing, wherein each of said radial cuts forms an airflow channel without being blocked by any part of the housing or the electric motor.

* * * * *